July 16, 1968     I. JEPSON ET AL     3,393,295
COOKING DEVICE WITH PROPORTIONING CONTROL
Filed Dec. 29, 1964     10 Sheets-Sheet 1
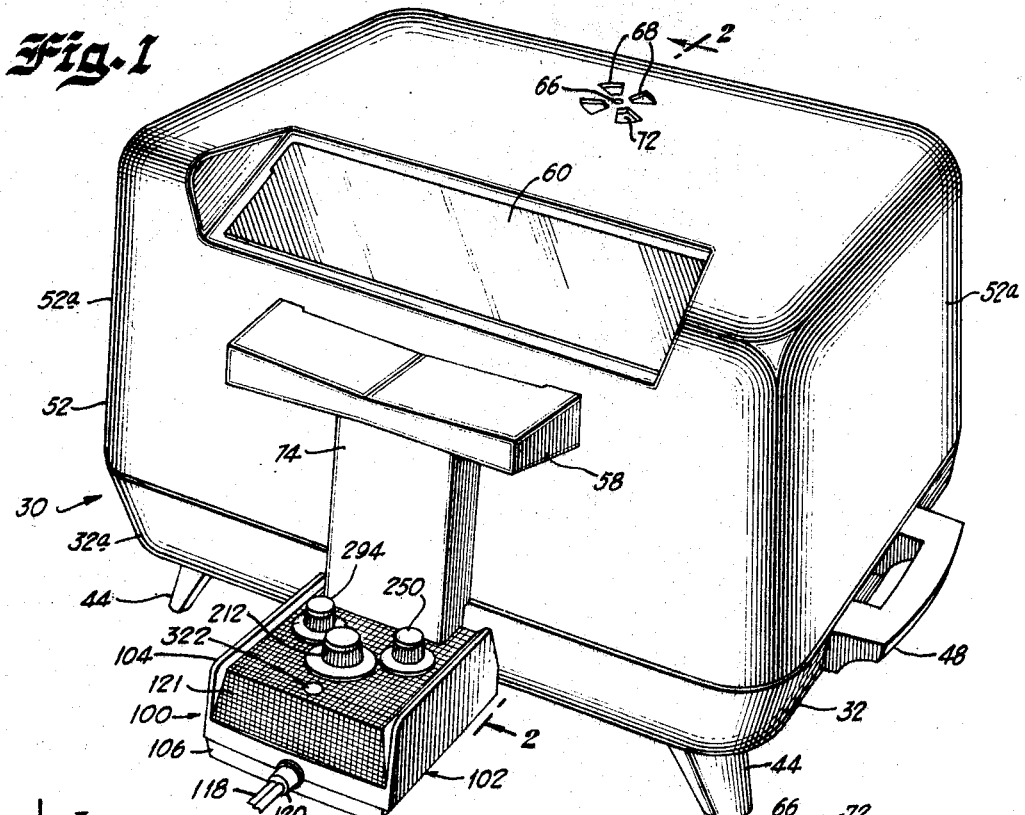
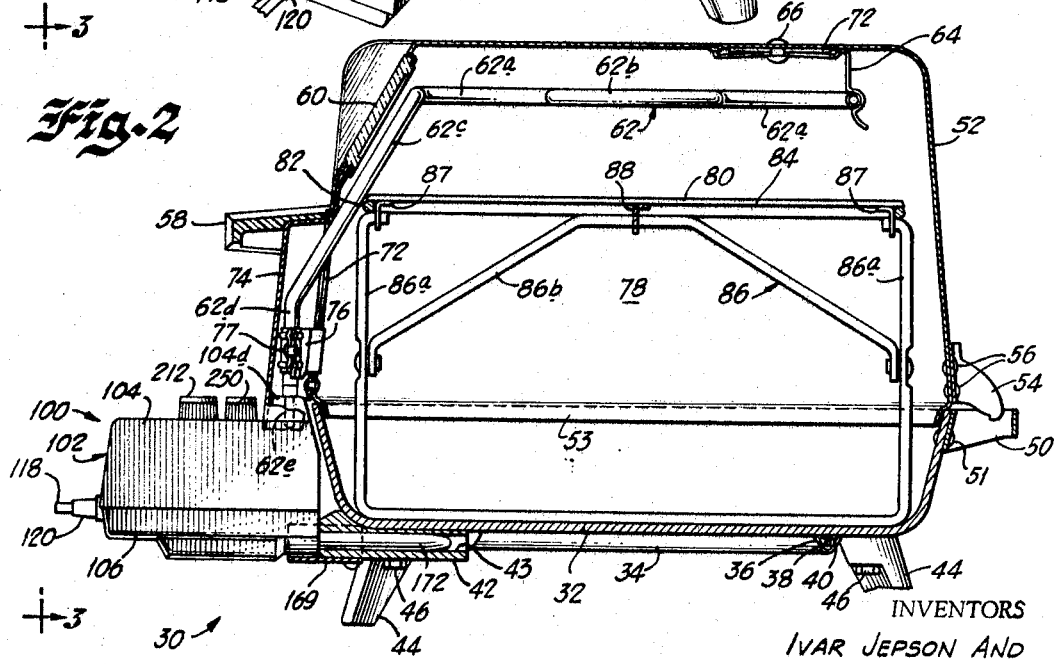
INVENTORS
IVAR JEPSON AND
MOISES B. LORENZANA
by George R. Clark
ATTORNEY.

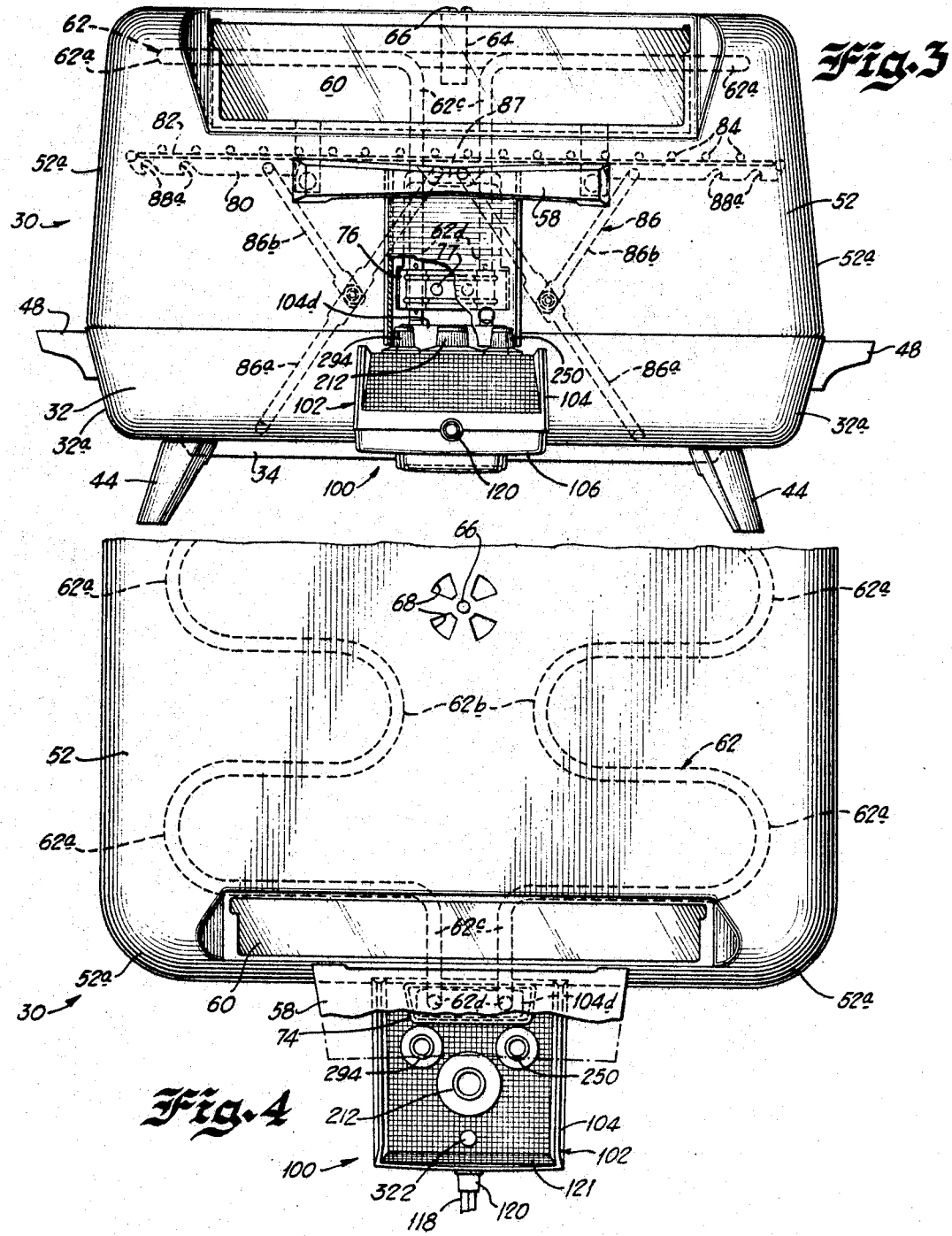

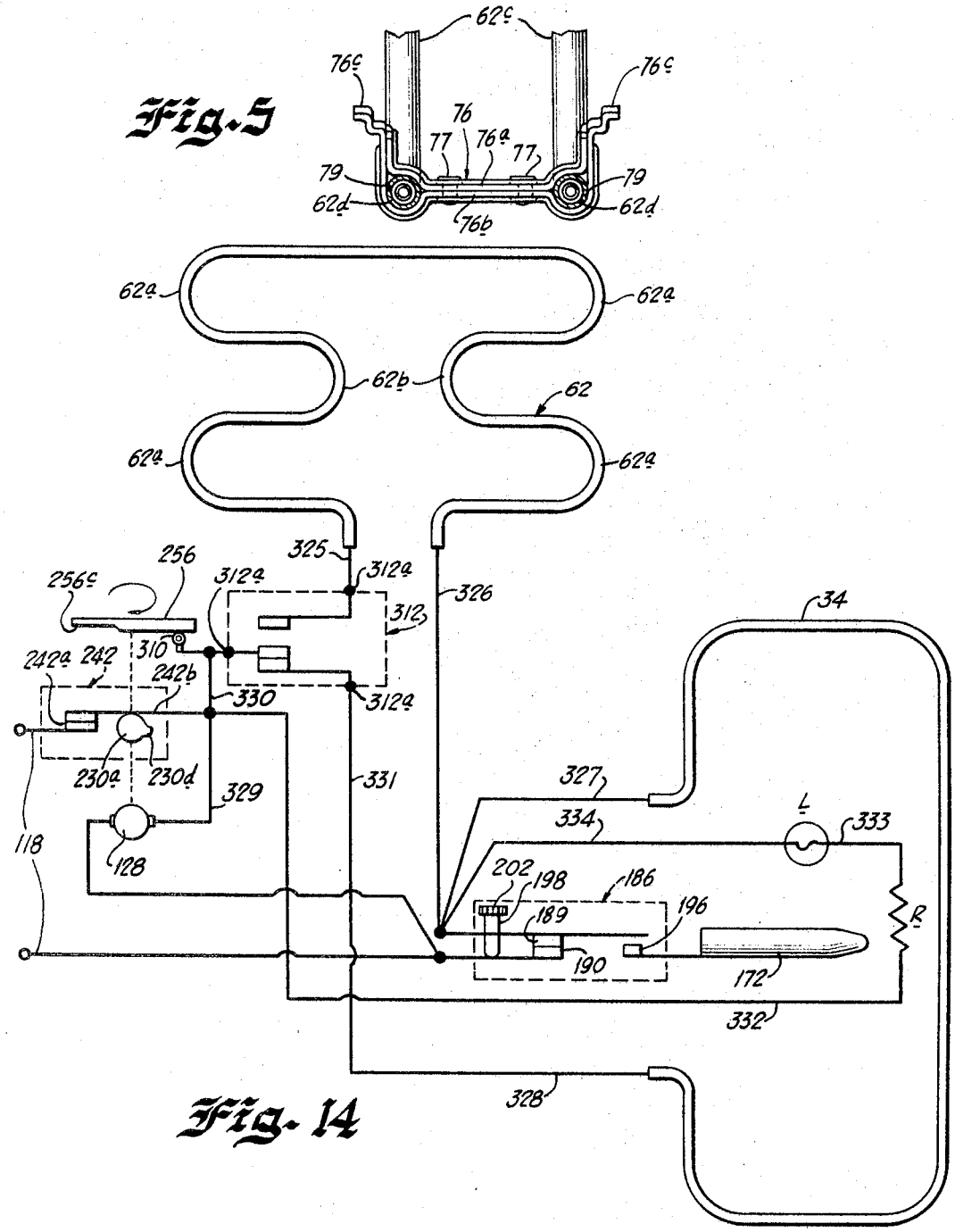

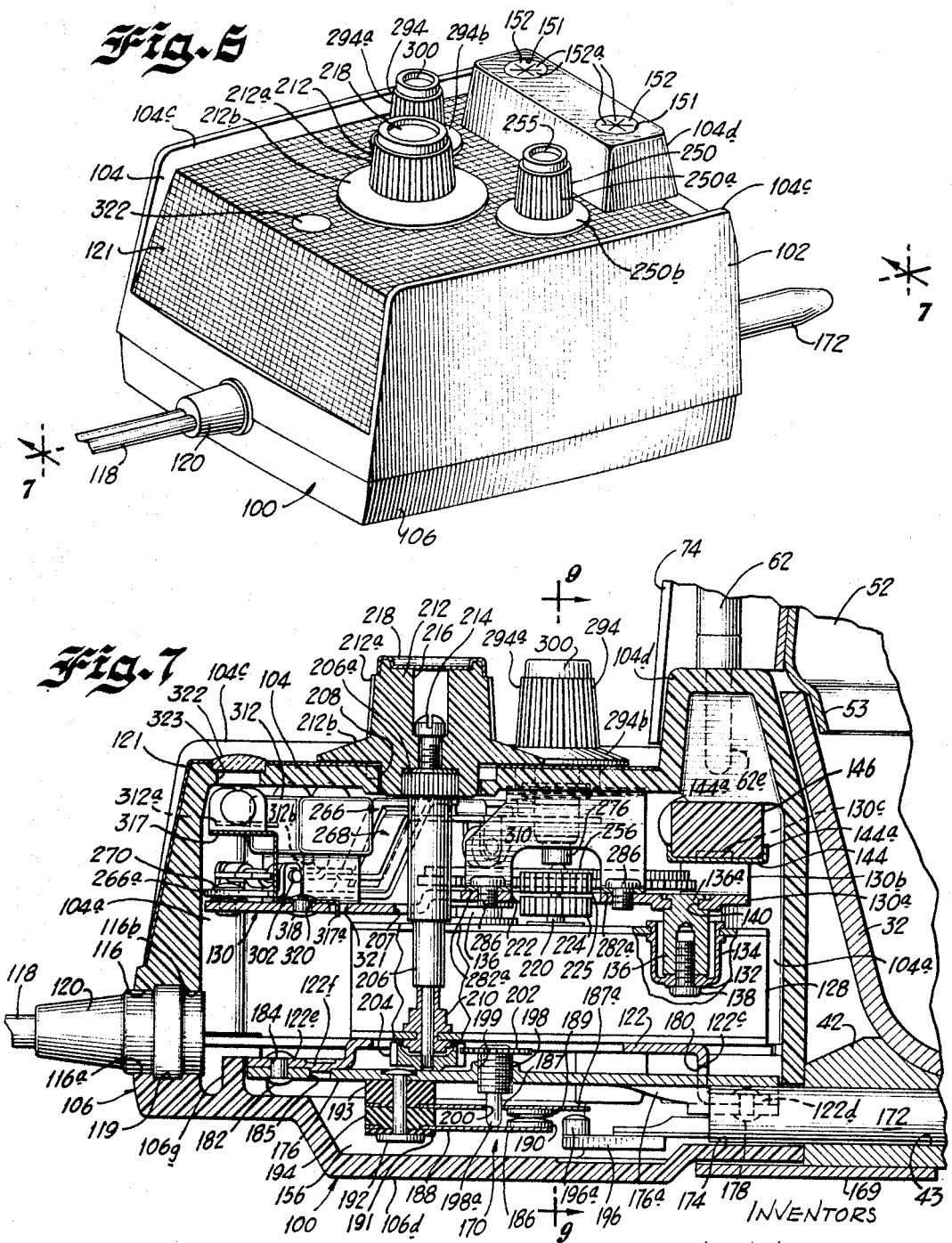

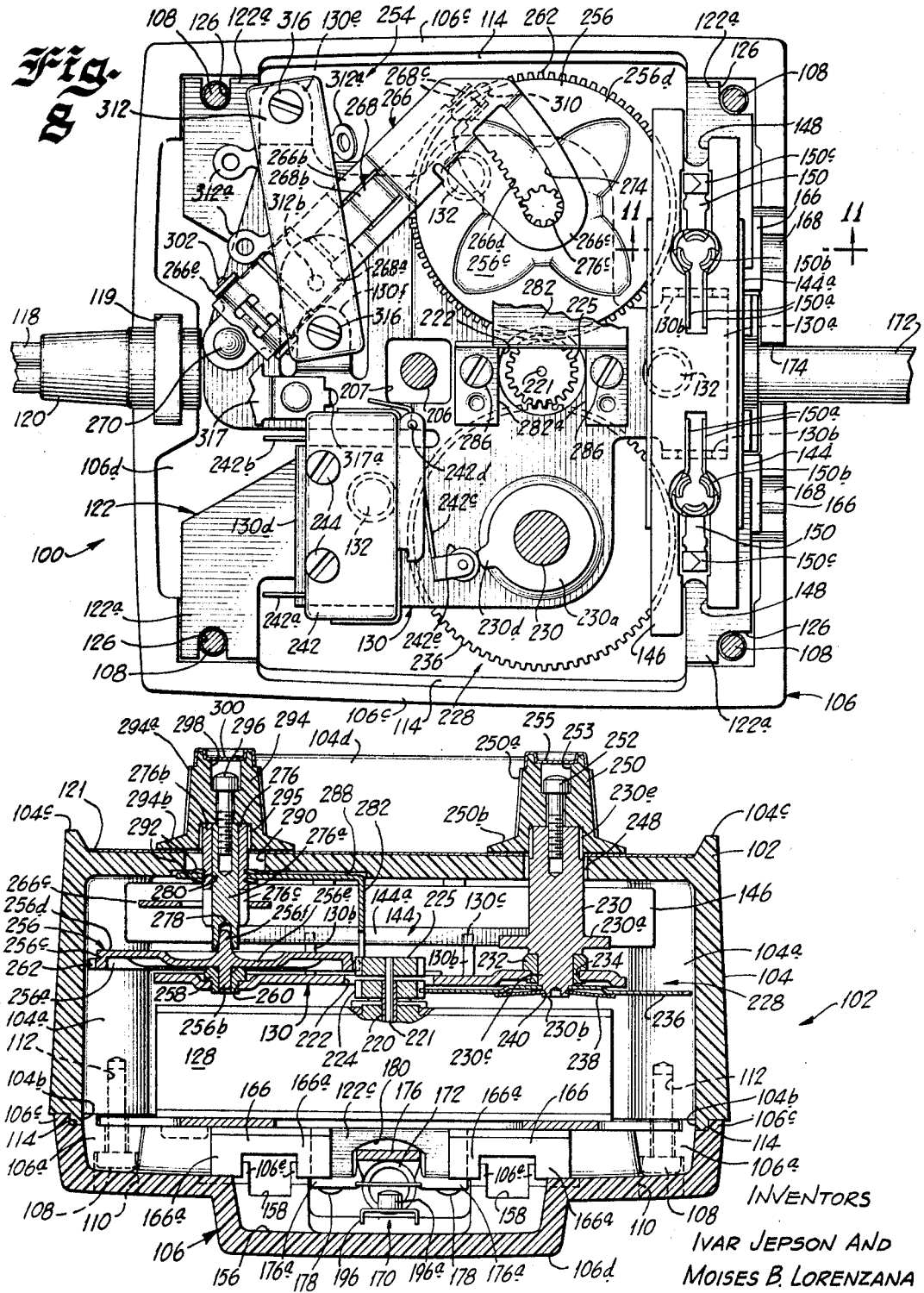

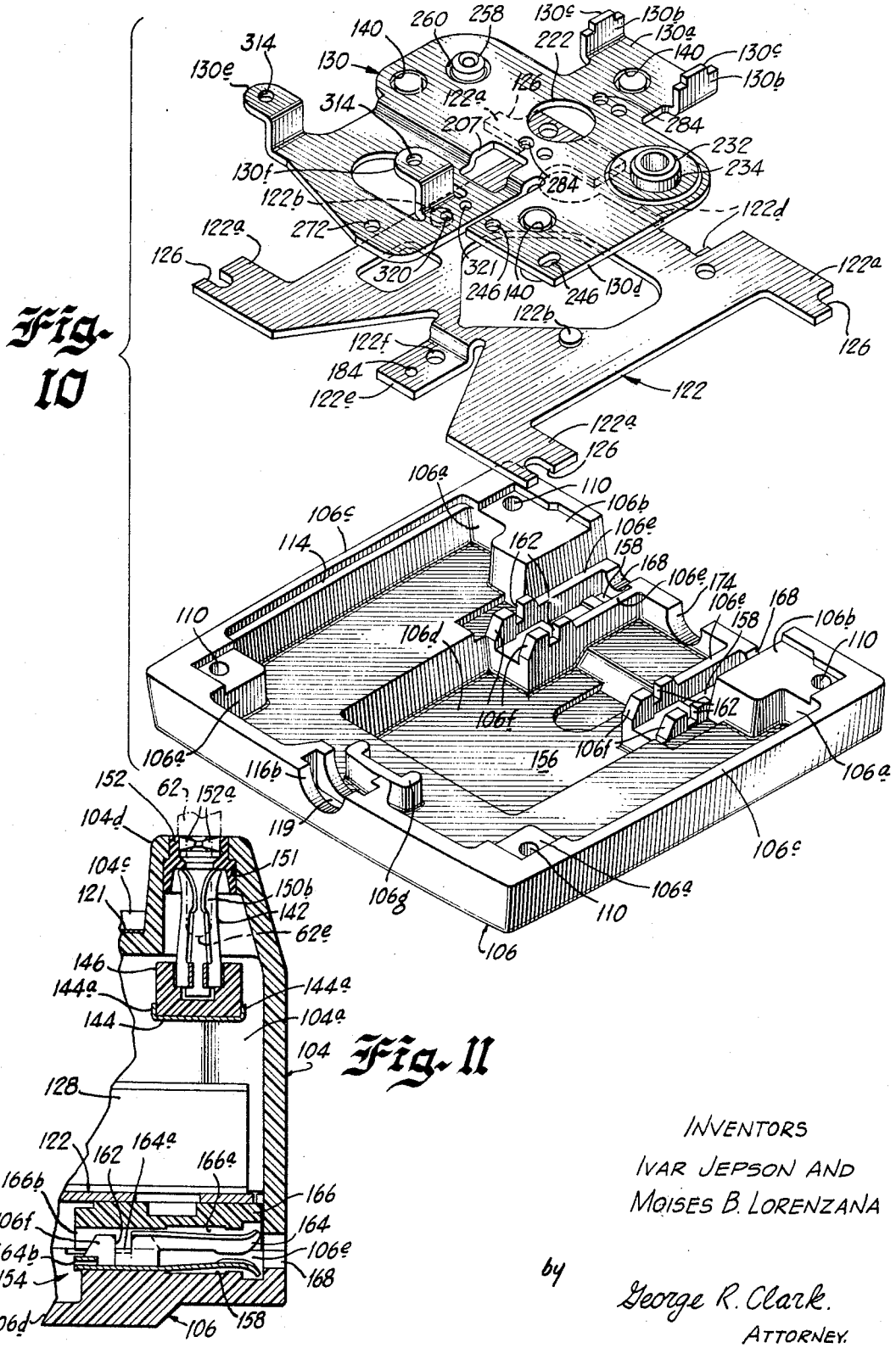

INVENTORS
IVAR JEPSON AND
MOISES B. LORENZANA by George R. Clark.
ATTORNEY

July 16, 1968     I. JEPSON ET AL     3,393,295
COOKING DEVICE WITH PROPORTIONING CONTROL
Filed Dec. 29, 1964     10 Sheets-Sheet 8
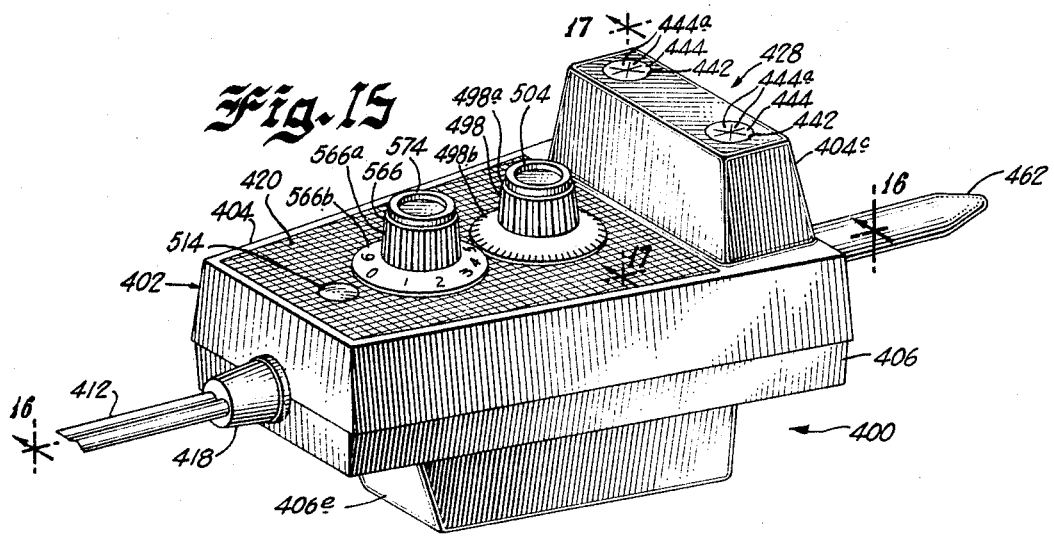
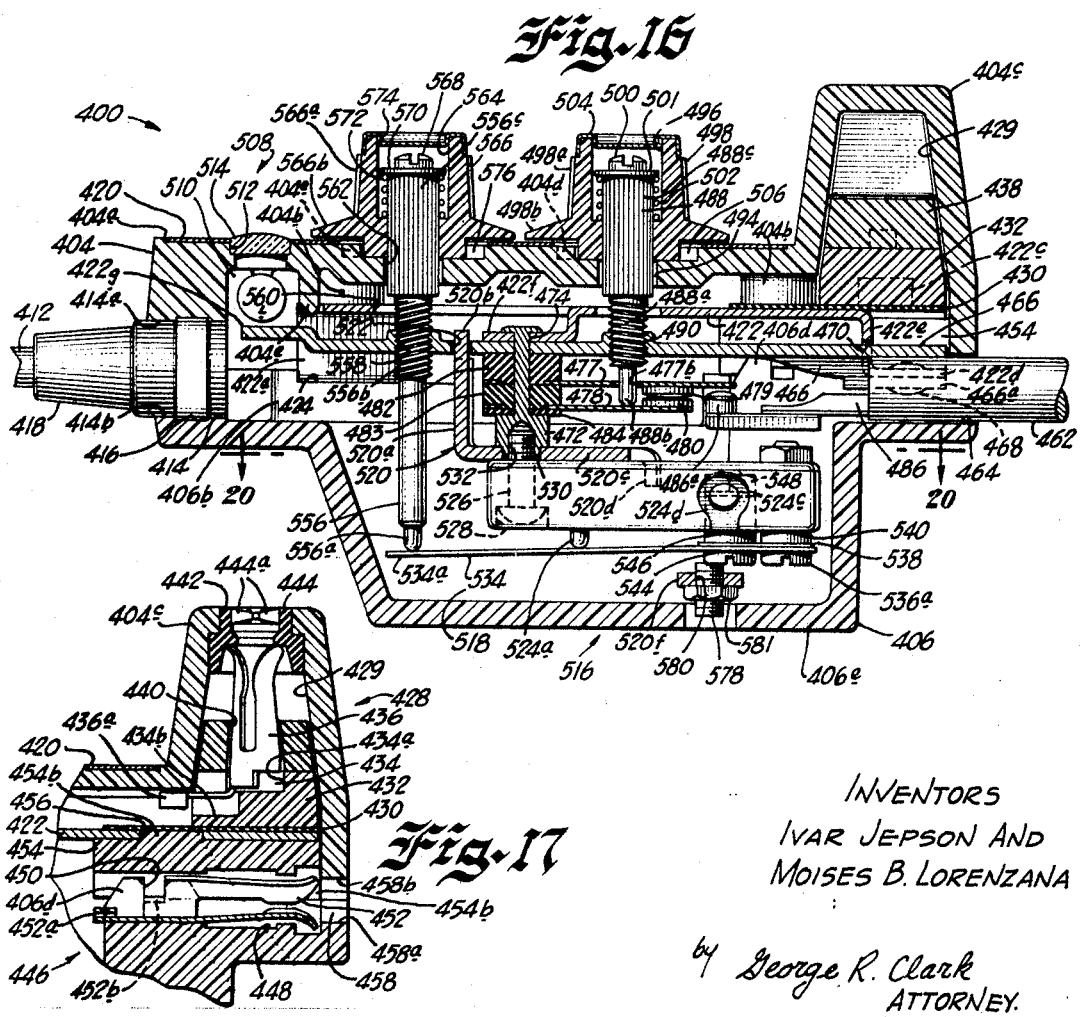
INVENTORS
IVAR JEPSON AND
MOISES B. LORENZANA
by George R. Clark
ATTORNEY.

July 16, 1968     I. JEPSON ET AL     3,393,295
COOKING DEVICE WITH PROPORTIONING CONTROL
Filed Dec. 29, 1964     10 Sheets-Sheet 9
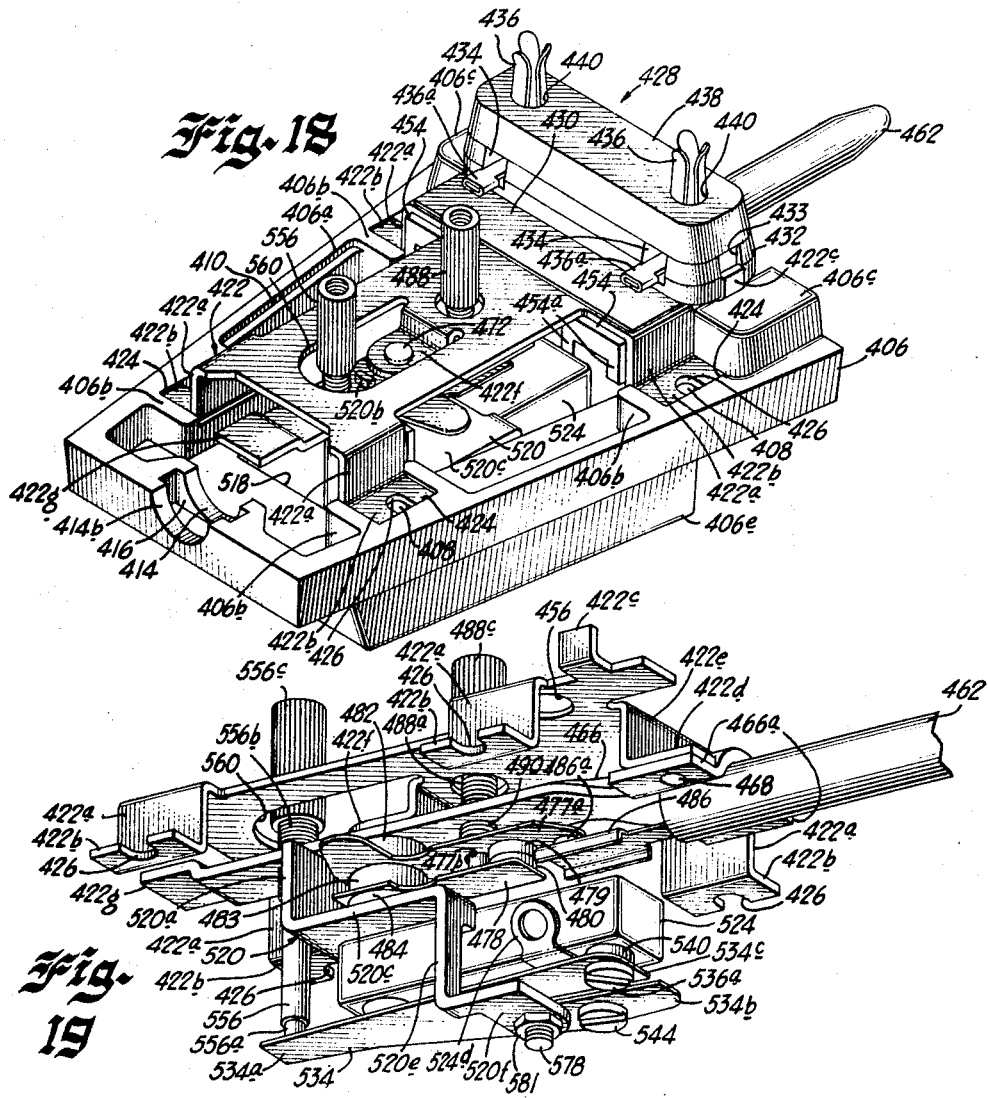
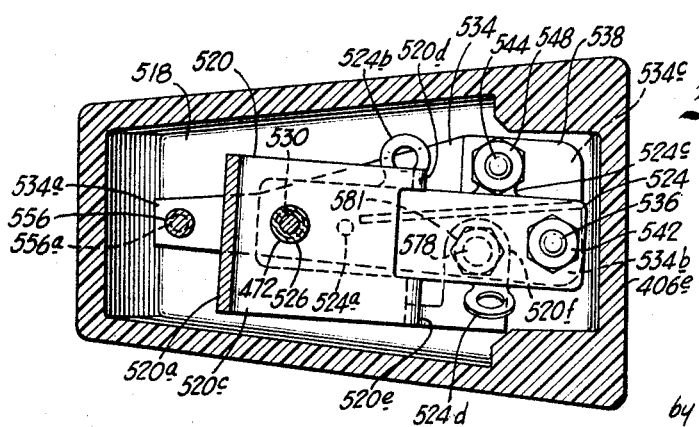
INVENTORS
IVAR JEPSON AND
MOISES B. LORENZANA
by George R. Clark.
ATTORNEY.

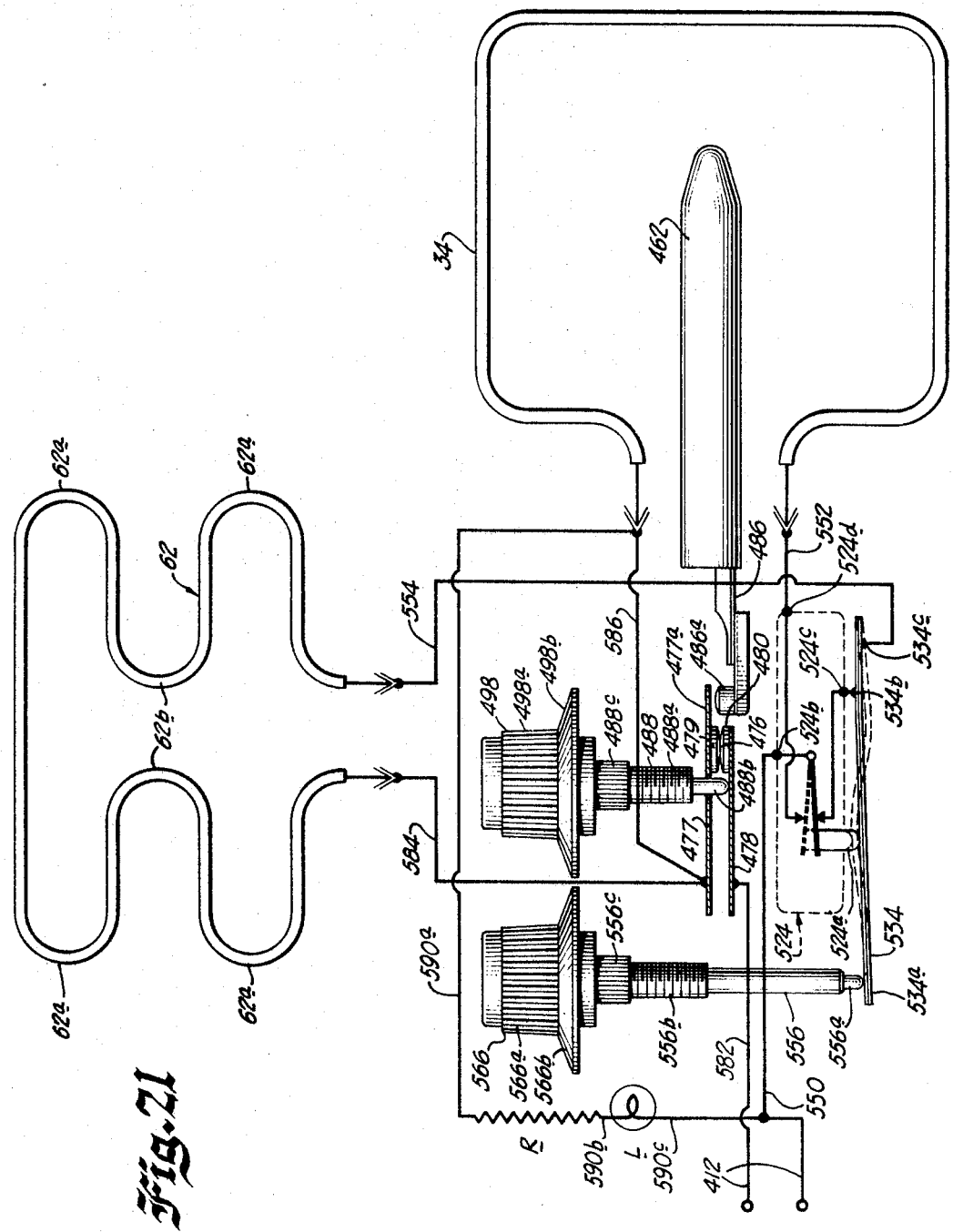

United States Patent Office 3,393,295
Patented July 16, 1968

3,393,295
COOKING DEVICE WITH PROPORTIONING CONTROL
Ivar Jepson, Sister Bay, Wis., and Moises B. Lorenzana, Glen Ellyn, Ill., assignors to Sunbeam Corporation, Chicago, Ill., a corporation of Illinois
Filed Dec. 29, 1964, Ser. No. 421,795
12 Claims. (Cl. 219—398)

ABSTRACT OF THE DISCLOSURE

A cooking vessel including a pan with a lower electric heating element supported on its underside and a deep cover with an upper heating element supported within. A removable thermostatic control is supported on the pan with a heat probe in heat sensing relation with the pan. The control is connected to the lower heating element for energization thereof. When the cover is closed, an electrical connection for energizing the upper element is completed. The control serves thermostatically to control the energization of either element or both elements in a repeating, alternating sequence. In one embodiment the proportional on time of the elements is controlled by an adjustable cam, and in other embodiment by an adjustable bimetal actuator.

---

This invention relates to electric cooking devices and more particularly to self-contained electrically heated cooking devices capable of performing the functions of a frying pan, broiler, and oven.

Self-contained electrically heated cooking devices have become increasingly popular throughout the past several years. The first such device to gain popularity was the electric frying pan. One customary type of electric frying pan includes a cast metal pan of shallow depth in which foods may be fried. An electric heating element is commonly associated with the underside of this type of pan and control means may be provided to regulate the electric power supplied to the heating element. This control means may include a thermostatically controlled switch which limits the pan temperature by disconnecting the heating element when the temperature rises to a predetermined point. An example of this type of electric frying pan may be found in Patent No. 3,068,342, issued to Ivar Jepson and Chester H. Wickenberg, patented Dec. 11, 1962, which is assigned to the same assignee as the present application.

Although the self-contained electrically heated electric frying pan has met with great success, it has become desirable to produce other self-contained electric cooking devices which are capable of performing other cooking functions. In particular, certain electric ranges, such as are commonly found in the kitchen, are highly inefficient and unsatisfactory in the performance of the functions of broiling and baking. The kitchen range customarily has a large oven, requiring a considerable amount of electric energy to be heated to baking temperature and as a consequence, most electric ranges require special power need; for example, it is often necessary to provide a 220 volt supply circuit for an electric range, rather than 110 volt supply customarily found in the home. When it is desired to bake or broil a small amount of food, the electric range is particularly unsatisfactory. In addition, the operation of the oven in an electric range may tend to heat the entire kitchen to an uncomfortable degree. Furthermore, the electric range being immobile, and often having an oven in an inconvenient position, cleaning of the oven may be a difficult task.

Because of the difficulties encountered with the oven in an electric range, attempts have been made to provide a self-contained electrically heated cooking unit for performing the functions of baking and broiling. One suggested solution to this problem has been to provide a broiler cover for an electric frying pan.

One such device comprises a deep broiler cover enclosing an electrically operated heating element, which may be spaced above the bottom of the above described electric frying pan. Food to be broiled may be placed on a rack provided in the frying pan and broiled by the electric heating element suspended thereabove. The heating element contained in the broiler may be controlled by the same control unit which is customarily provided with the frying pan. Additionally, the thermostatic control means associated with the control unit may serve to regulate the air temperature in the enclosed cooking area. An example of such a cooking device may be found in the copending application of Ernest Lee, Melvin Krauss, and Chester Wickenberg, Ser. No. 154,474 filed Nov. 24, 1961, and assigned to the same assignee as the present invention.

Although this solution has provided an electric appliance which may perform the functions of frying and broiling, it is still not entirely satisfactory. Since the appliance is adapted to be plugged into a standard 110 volt electric outlet, and since each heating element is designed to operate at the peak wattage output, it is not possible to operate the pan heating element and the cover heating element simultaneously. Since in the devices developed thus far the single control unit may be connected to the pan element or to the cover element only, it is difficult to conveniently operate both elements in sequence or alternatively during the same cooking operation. In the cooking of many foods, it would be highly desirable to be able to operate both elements alternatively during the same cooking operation. For example, some foods, such as small roasts or fowl, are preferably cooked relatively slowly so that they are cooked all the way through, but in addition should be browned on the outside by brief subjection to high heat. With the pan and broiler cover above described, the only way that this can be done is by connecting the control unit manually to the pan element for the slow cooking, and then manually disconnecting the control unit from the pan element and connecting it to the cover element for a brief period of broiling.

Accordingly, it is an object of the present invention to provide a self-contained electrically heated cooking device capable of performing the functions of baking, frying, and broiling during the same cooking operation without the necessity for manual connection and disconnection of the control unit.

It is a further object of the present invention to provide a control unit for simultaneously controlling an upper and lower electric heating element capable of automatically operating the elements.

Also, it is an object to provide such a control unit which can be removed from the cooking device, so that the cooking device can be entirely immersed for cleaning.

It is another object of the present invention to provide an electric cooking device having a pan heating element and a cover heating element and a single control unit which may be detachably connected to both heating elements simultaneously.

It is another object of the invention to provide an electric cooking device having a pair of heating elements and a control unit capable of automatically operating first one and then the other heating element during the same cooking operation.

It is a further object of the present invention to provide an electric cooking device having two heating elements responsive to a single control unit capable of providing selective temperature control of the device over a wide heating range.

It is a further object of the present invention to provide a control unit for a cooking device having plural electric heating elements capable of automatically operating different elements in sequence with the proportion of the time of operation of each element variable according to the wish of the operator.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is a perspective view of a cooking device and proportioning control constructed in accordance with the present invention.

FIG. 2 is a side view of the cooking device and proportioning control of FIG. 1, partly in section, taken along the line 2—2 of FIG. 1.

FIG. 3 is an end view of the cooking device and proportioning control of FIG. 1, partly broken away, taken from the line 3—3 of FIG. 2.

FIG. 4 is a partial top view of the cooking device and proportioning control of FIG. 1, with part of the cover handle shown only in broken lines for clarity.

FIG. 5 is an enlarged cross-sectional view of part of the upper heating element and spring clamp of the cooking device of FIG. 1.

FIG. 6 is an enlarged perspective view of the proportioning control of FIG. 1, removed from the cooking device.

FIG. 7 is an enlarged cross-sectional side view of the control of FIG. 6, taken along the line 7—7 of FIG. 6, associated with the cooking device of FIG. 1, a part of which is shown in section.

FIG. 8 is an enlarged top plan view of the control of FIG. 6 with part of the casing removed and with some of the parts broken away.

FIG. 9 is an enlarged cross-sectional end view of the control of FIG. 6, taken along the line 9—9 of FIG. 7.

FIG. 10 is an exploded perspective view of the lower casing portion and mounting plates of the control of FIG. 6.

FIG. 11 is a cross-sectional partial view of the control of FIG. 6, taken along the line 11—11 of FIG. 8.

FIG. 14 is a schematic diagram illustrating the operation of the electrical circuit of the cooking device and proportioning control of FIG. 1.

FIG. 15 is a perspective view of an alternative embodiment of a proportioning control in accordance with the present invention, which is adapted for use with the cooking device of FIG. 1.

FIG. 16 is an enlarged cross-sectional side view of the control of FIG. 15, taken along the line 16—16 of FIG. 15.

FIG. 17 is an enlarged partial cross-sectional view of the control of FIG. 15, taken along the line 17—17 of FIG. 15.

FIG. 18 is a perspective view of the control of FIG. 15, with the upper casing portion removed.

FIG. 19 is a perspective view of part of the interior structure of the control of FIG. 15, with the casing and some parts removed.

FIG. 20 is a cross-sectional top view of the control of FIG. 15, taken along the line 20—20 of FIG. 16.

FIG. 21 is a schematic diagram illustrating the operation of the electrical circuit of the control of FIG. 15 when associated with the cooking device of FIG. 1.

Figure 12:
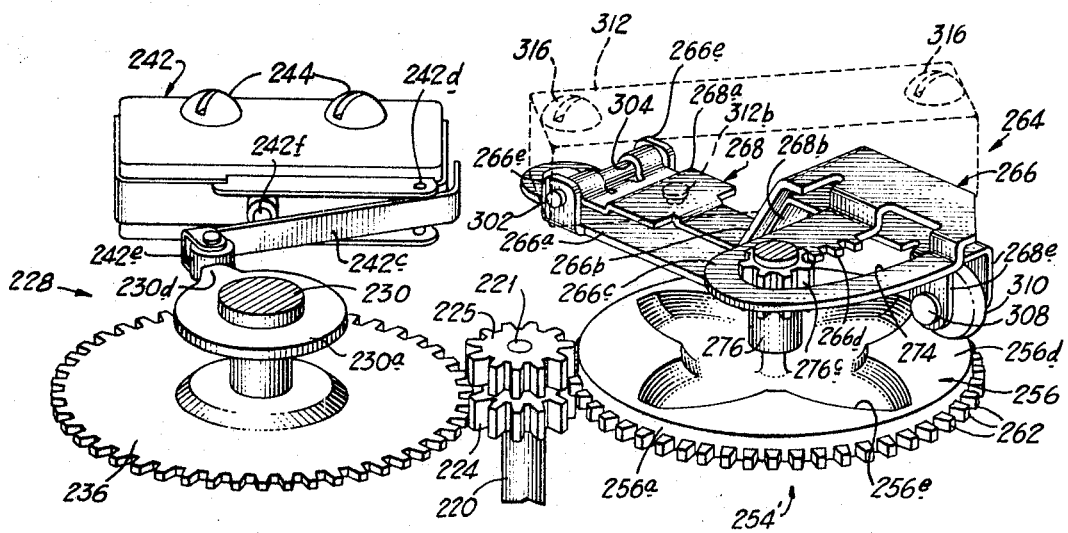
FIG. 12 is an enlarged perspective view of part of the structure of the control of FIG. 6, partly in broken lines, with the structure shown in its operative position but removed from the control.

In brief, the cooking device of the present invention includes a shallow pan portion similar to the customary electric frying pan. A deep broiler cover is provided for the pan, and is removably hinged thereto. Both the pan and the cover have an electric heating element associated therewith. A control unit is provided for the operation of these heating elements, and provision is made for the removable attachment of the control unit to the cooking device so that simultaneous connection is made with both heating elements. Thermostat actuated switching means are associated with the control unit, and include a heat sensing probe adapted to be in intimate heat transfer relation with the pan when the control unit is attached to the pan. Within the control unit, means may be provided for automatically timing the duration of a cooking operation. In addition, means are provided for controlling the operation of the two heating elements so that during a single heating operation either one of the two elements may be used exclusively, or both heating elements may be operated during the cooking operation, each for any desired proportion of the time of the total operation. In accordance with a unique feature of the invention, means are provided whereby when both elements are to be operated during the same cooking operation, they are each operated alternatively in the desired proportion of time over a relatively brief cycle which is continuously repeated throughout the longer cooking operation.

Now having reference to the drawings, and more particularly to FIG. 1, there is illustrated a cooking device designated generally as 30. The cooking device includes a pan 32 of generally rectangular shape having slightly rounded corners 32a, being generally of the shape of the customary electric frying pan. In the illustrated embodiment of the invention the pan 32 has the dimensions of approximately 11" by 14", and may be between one and three inches deep. The pan 32 comprises a metal casting, which in the illustrated embodiment is of aluminum which metal has particularly satisfactory heat transfer characteristics.

The pan 32 of the illustrated invention is similar to the pan portion of the electric frying pan illustrted and described in considerable detail in the above mentioned Patent No. 3,068,342 of Ivar Jepson and Chester H. Wickenberg.

To the underside of the pan 32 is welded or braised a lower heating element 34 which is encased in a metal sheath 36 and includes a central resistance element 38 and insulating material 40, as is well known in the art. When electric current is passed through the heating element 34, heat is generated throughout the length of resistance element 38. This heat is transferred to the pan 32 by conduction, which process is aided by the triangular shape of the metal sheathing 36.

As will be understood by those skilled in the art, and as pointed out with more particularity in the above mentioned patent, the two ends of the heating element are formed into terminals which are supported in a heating element support 42 and which are adapted to be electrically connected, in a manner to be described, to a suitable electric socket. As can be seen in FIG. 2, heating element support 42 includes a cylindrical bore 43 for the insertion of a bimetal probe as will hereinafter be described.

In order to space the cooking device from the surface upon which it is placed, and to provide suitable support therefor, each corner of the device is provided with a leg 44 mounted to the bottom of the pan by means of a leg mounting screw 46. In the embodiment illustrated the legs are formed of Bakelite, in order to insulate the heat of the pan from the working surface.

The pan 32 is provided with a pair of oppositely disposed handles 48, used to transport the cooking device. For this purpose, the handles 48 are preferably formed of a material having low heat conductivity, and are secured to the sides of the pan 32 in any suitable fashion.

In addition, the side of the pan 32 opposite the ends of the lower heating element is provided with one or more lower hinge elements 50 for the attachment of a cover. The hinge elements 50 are secured to the side of the pan 32 by means of the hinge mounting screws 51.

The cooking device 30 additionally comprises a cover 52 which may also be formed of aluminum. The cover 52 has rounded corners 52a, and is of a shape designed to mate with the pan 32. The cover is relatively deep, its depth in the illustrated embodiment being about 7 inches. At its lower edge the cover 52 has a lip 53 (FIG. 2) which engages the top edge of the pan 32, holding the cover in place and preventing the leakage of moisture and vapor from the cooking area.

One side of the cover is provided with one or more upper hinge elements 54 which are adapted to cooperate with the lower hinge element 50 in hinging the cover 52 to the pan 32 and which are secured to the cover 52 by means of suitable fasteners 56. As is known to those skilled in the art, the hinge elements may be adapted to selectively hold the cover 52 in a position elevated from the pan 32 and to be entirely separable when it is desirable to remove the cover 52 for cleaning and the like.

On the side of the cover 52 opposite the upper hinge elements 54 there is provided a handle 58 suitably secured to the cover and useful in raising or removing the cover from the pan. The cover 52 is also provided with a transparent heat resistant window 60 formed of glass or other similar material through which food within the device is visible from its exterior.

The cover 52 is provided with an upper heating element 62 which is similar in construction and cross-section to the lower heating element 34, except that the sheathing of the upper heating element is circular rather than triangular in shape. Also the upper heating element is formed in a shape which has been found to be more effective in distributing heat throughout the cover 52.

As can best be seen in FIGS. 4 and 14, the heating element 62 comprises a single turn loop having four outwardly disposed lobes 62a and a pair of inwardly disposed labes 62b. Most of the length of the upper heating element 62 is positioned parallel to the bottom of the pan and is effective in operation in broiling foods in the cooking area by subjecting them to direct heat radiating from above.

To hold the upper heating element 62 in its operative position there is provided an element holding spring latch 64 which is held to the top of the cover 52 by means of a fastening stud 66. Adjacent the fastening stud 66, the cover 52 is provided with air vent openings 68 and the fastening stud 66 also holds a rotatable vent panel 72, movable to open or close the air vent openings 68, thus providing an opening at the top of the pan for release of moisture and vapor, when desired.

The upper heating element 62 includes inclined portions 62c and vertical portions 62d. The vertical portions 62d terminate in a pair of element terminals 62e which are adapted to be received by suitable socket means, as will be described. One side of the cover 52 is partially cut away at 72 to permit the inclined and vertical portions 62c and 62d of the upper heating element 62 to extend therethrough and the cutaway portion 72 is enclosed by a terminal cover 74, attached to the cover 52.

The vertical portion 62d of the upper heating element 62 is held in position under the terminal cover by an element clamp 76 which, as best seen in FIG. 5, includes an inner portion 76a and an outer portion 76b which are held together by means of rivets 77. In assembled relation, the element clamp portions 76a and 76b form a pair of spaced generally annular openings 79 which are adapted to receive the vertical portion 62d of the element 62. During construction, the element clamp is securely staked to the element 62 to insure stable mounting of the heating element within the cover 52. The clamp 76 also includes a pair of legs 76c which are adapted to bear against the edges of the cutaway portion 72 of the cover 52, thus holding the upper heating element firmly in position.

It should therefore be understood that the upper heating element 62 may be removed from the cover 52 when it is desired to clean the cover. In order to remove the heating element, the cover must be first raised or removed from the pan 32. Then the spring latch 64 is flexed, thus releasing the upper heating element 62. Then the heating element 62 may be entirely removed by withdrawing the element from the cover. When the element 62 is entirely removed from the cover 52, the cover may be efficiently cleaned by total immersion in soap and water or other fluid.

As can be seen best in FIG. 2, the pan 32 and the cover 52 enclose a cooking area designated as 78. This cooking area may be heated from the top by the upper heating element 62 or from the bottom by the lower heating element 34. A trivet assembly 80 is provided for the purpose of holding food above the bottom of the pan 32. The trivet 80 includes a grill platform 82 which is parallel to the bottom of the pan 32 and which supports a plurality of cross pieces 84 upon which food may rest during the cooking operation.

The grill platform 82 is supported by adjustable legs 86. Each leg includes a generally U-shaped supporting portion 86a having one end suitably hinged in a hinge support 87 positioned at the center of the grill platform 82. In addition, each adjustable leg 86 includes a cross piece 86b having one end pivotably mounted to the center of the supporting leg portion 86a. The other end of the cross piece 86b seats in any one of a plurality of slots 88a which are provided in a pair of support brackets 88. Thus it can be seen that the height of the grill platform 82 may be adjusted by inserting the cross piece 86b in the various slots 88a provided in the brackets 88, and that the distance between the food resting upon the grill platform 82 and the upper heating element 62 may be varied in this manner.

In order to control the two heating elements associated with the cooking device 30, and in accordance with a unique aspect of the present invention, there is provided a control unit 100 adapted for connection to the cooking device. The control unit 100 includes a casing 102 formed of an upper portion 104 and a lower portion 106, which are held together by means of screws or other fastening devices 108 inserted into recessed openings 110 in the lower casing portion 106 and threaded into holes 112 which are provided in mounting shoulders 104a in the corners of the upper casing portion 104. The lower casing portion 106 includes similar mounting shoulders 106a, two of which include enlarged extensions 106b, for a purpose later to be described. When assembled, the upper and lower casing portions 104 and 106 are held in alignment by means of recessed grooves 114 which form shoulders 106c on the upper edge of the lower casing 106, and a ridge 104b on the upper casing portion 104 which abuts the shoulder 106c.

An opening 116, comprising recesses 116a and 116b in the upper and lower casing portions 104 and 106, accommodates the passage of a power cord 118 into the control unit 100. The opening 116 includes an enlarged internal recess 119 which receives a strain relief member 120 fixed to the power cord. For reasons of clarity, in the drawings the electrical wiring within the control unit 100 is omitted, except in the schematic diagrams, so that the power cord, although illustrated as terminating in the strain relief member 120, actually extends into the control unit for suitable connection therein.

For purposes of decoration and protection, the upper casing portion 104 includes a foil inset 121 on its top and front surfaces, surrounded by raised shoulders 104c.

The lower casing mounting shoulders 106a are slightly recessed from the top of the lower casing portion 106 in order to receive a lower mounting plate 122. The plate 122 has four extending feet 122a which are adapted to lie in the corners of the lower casing portion 106 on the mounting shoulders 106a. Each extending foot 122a includes a gap 126 provided for the passage therethrough of one of the screws 108.

An encased electrical clock movement 128, the function of which will be described in detail hereinafter, is carried on the lower support plate 122. An alignment protuberance 122b (FIG. 10) on the lower plate 122 fits into a corresponding recess (not visible) in the clock movement 128, and aids in correctly positioning the clock movement.

Above the clock movement 128 an upper mounting plate 130 is held in place by means of three fastening devices 132. Each fastener 132 includes a cup-shaped element 134 (FIG. 7) which is recessed in the clock movement 128, and which surrounds a mounting extension 136 held therein by a screw 138. The upwardly extending mounting extensions 136 include reduced end portions 136a for attachment to holes 140 provided for that purpose in the upper mounting plate 130.

Thus the lower plate 122 is held in position between the mounting shoulders 106b and 106a and the clock movement is held in alignment on top of the lower mounting plate and in turn carries the upper plate 130 securely thereon.

In order to connect the control unit 100 with the upper heating element 62 when the control unit is affixed to the cooking device 30, there is provided a pair of upper terminal connecting means 142 (FIG. 11) associated with a raised portion 104d of the upper housing 104. The connecting means 142 includes a terminal block tongue 130a (FIG. 10) associated with the upper mounting plate 130. Tongue 130a includes a pair of upstanding supporting legs 130b each having a reduced end tab 130c. The tabs 130c fit into cooperating recesses in a terminal block holder 144, which is supported upon the legs 130b and a terminal block 146 is carried on the holder 144 between a pair of opposed upturning flanges 144a.

Supported in a pair of recesses 148 in the terminal block 146 are two terminal elements 150 which are formed of resilient electrically conductive material. Each element 150 includes a pair of spring legs 150a which bear against the sides of recess 148 to hold the elements 150 in place. The central portion of the terminal elements 150 comprise three prong connectors 150b for receiving the upper element terminals 62e, while the outwardly directed ends 150c are adapted for easy connection to wire connectors.

Directly above the three prong connectors 150b the raised casing portion 104d is provided with openings 151, each of which carries a resilient grommet 152 formed of rubber, plastic, or the like. As can be seen in FIGS. 6 and 11 the grommets 152 include a plurality of inwardly extending flexible tongues 152a for closing the openings 151 when the upper heating element 62 is not connected to the control unit.

It should be understood that when the control unit 100 is connected to the cooking device 30, the end terminals 62e of the upper heating element 62 will extend downwardly into the three prong connectors 150b when the cover 52 is closed. When the cover 52 is opened, element 62 will be disconnected from the control unit 100, and the flexible tongues 152a will close, thus preventing food or grease from entering the control unit 100. Accordingly, the upper heating element 62 will be in a safe, disconnected condition whenever the operator of the cooking device raises the cover 52.

In order to provide for connection of the lower heating element 34 to the control unit 100, there are provided lower heating unit connecting means 154. As can best be seen in FIGS. 7, 9 and 10 the lower casing portion 106 includes a lowered floor section 106d which defines a well 156. Associated with this well 156 are a spaced pair of mounting sockets 158, defined by upstanding wall portions 106e, each of which includes a raised end portion 106f (FIG. 10) having a mounting slot 162 therein. The mounting sockets 158 are adapted to receive resilient three prong conductive connectors 164, (FIG. 11) each of which includes an opposed pair of mounting flanges 164a which fit into the slots 162 thereby holding the connectors 164 in position.

To further hold the connectors 164 in position there are provided a pair of terminal blocks 166 which overlie sockets 158 and which include downwardly extending flanges 166a which surround the walls 106e. The terminal blocks 166 abut the against the enlarged portions 106b of the lower casing 106. It should be noted that the terminal blocks 166 also include mounting shoulders 166b which abut the raised portions 106f of the walls 106e, thereby preventing movement of the blocks 166 with respect to the casing 102.

Connection of the three prong connectors 164 may be made to the elements of the control assembly through the provision of rearward portions 164b which are adapted to be connected to suitable wire conductors.

As can best be seen in FIGS. 2 and 7, when the control unit 100 is connected to the cooking device 30 the control unit abuts the heating element support 42. This connection may be facilitated through the provision of a guiding plate 169 under the support 42. As described above, the two ends of the heating element 34 are carried in the support 42 and include extending terminal portions adapted to extend through openings 168 in the casing and make connection with the three prong connectors 164.

Centrally disposed in the well 156 is a temperature control assembly 170 which includes a bimetal probe 172 which extends outside of the control unit through an opening 174 in the casing 102. As can be seen in FIGS. 2 and 7 the bimetal probe 172 is received in a bore 43 in the element support 42, and is thereby placed in intimate heat sensing relationship with the cooking surface of the cooking pan 32.

In order to provide for the support of the bimetal probe 172 and other elements of the temperature control assembly 170 there is provided a support plate 176, one end of which is welded or otherwise suitably fastened to the probe 172. The plate 176 includes a pair of lateral outwardly extending ears 176a which are adapted to be secured to a pair of mounting ears 122d on a supporting flange 122c extending downwardly from the lower mounting plate 122. The ears 176a are fastened to the ears 122d by means of rivets or other suitable fasteners 178. A recess 180 in the flange 122c permits the passage therethrough of the support plate 176, which at its other end is fastened to another supporting flange 122e by means of a rivet or other fastener 182, which passes through an opening 184 in the flange 122e.

Alignment of the support plate 176 and the lower mounting plate 122 is facilitated by means of a protuberance 122f in the mounting plate and a cooperating opening 185 in the support plate. The lower mounting plate flange 122e and the support plate 176 are held in place by means of a positioning guide 106g (FIG. 10) formed on the bottom of the lower casing portion 106.

The temperature control assembly 170 includes, as shown best in FIG. 7, a switch 186 comprising a pair of generally parallel leaf spring members 187 and 188, carrying switch contacts 189 and 190. The spring members 187 and 188 are supported beneath the plate 176 by means of an elongated fastener 192 which also carries insulated spacers 191, 193 and 194.

As will be readily understood by those skilled in the art, the probe 172 includes an actuating member 196 which is movable in response to changes in heat which are sensed by the probe. In the illustrated device, actuating member 196, due to temperature differentials of the elements of the probe 172, will move in an upward direction, as viewed in FIG. 7, when the pan 32 is subjected to an increase in temperature. The actuating member 196 includes an insulated member 196a adapted to exert an upward force on an extension 187a of the leaf spring member 187 when the pan 32 reaches a critical temperature, and open the switch 186.

To provide for selective control of the temperature at which the switch 186 will be opened, an adjusting screw 198 is held in a threaded opening 199 in the support plate 176. The screw 198 includes an insulated portion 198a which extends through an enlarged opening 200 in the leaf spring member 187 for engagement with the other leaf spring member 188.

The position of the adjusting screw 198 is controlled by a gear wheel 202 which is carried by the screw 198 and which cooperates with another gear 204 which is carried by a temperature control shaft 206. The shaft 206 extends upwardly through an opening 207 in the upper mounting plate 130 and an opening 208 in the top of the casing 102 and is journaled for rotation in a bearing 210 carried in the bottom of the clock movement 128.

A temperature control knob 212, fixed to rotate the shaft 206 by means of splines 206a, is held in position by means of a screw 214 which is inset in an opening 216 in the knob 212. The knob includes a substantially cylindrical portion 212a for manual turning of the knob, and a flange portion 212b which may be provided with temperature settings corresponding to the cut-off temperature of the temperature control assembly 170. The top of the knob 212 and the opening 216 may be covered by a decorative cap 218.

Now having reference to the electrical clock movement 128, which is mounted between the lower and upper mounting plates 122 and 130, a pair of concentric output shafts 220 and 221 (FIG. 12) extend upwardly through an enlarged opening 222 provided in the upper mounting plate 130. The outermost shaft 220, which is shorter than the inner shaft 221, carries a timer pinion gear 224, which has twenty-four circumferentially disposed teeth, and which rotates through 360° each hour that the clock movement 128 is on. Similarly the inner shaft 221 carries an identical control pinion 225 which also has twenty-four teeth, but which rotates once each minute. The opening 222 is large enough to allow pinions 224 and 225 to rotate freely therein.

In order to provide means for turning on the cooking device 30 and for timing the duration of a cooking cycle, there is provided a timer assembly 228 which includes (FIG. 12) a timer shaft 230 provided with a reduced end portion journaled for rotation in a sleeve bearing 232 which is held in an opening 234 provided for that purpose in the upper mounting plate 130 (FIG. 9). The shaft 230 also includes a further reduced mounting hub portion 230b extending beneath the plate 130, and a timer gear 236 is mounted on the hub 230b by means of a resilient locking washer 238 which is snapped into an annular recess 240 in the hub 230b. The timer gear 236 has 96 teeth, so that it is driven through one revolution for every four revolutions of the timer pinion 224, or through one complete revolution every four hours.

Above the upper mounting plate 130, the timer shaft 230 is provided with an enlarged cam portion 230a which provides a peripheral cam surface including thereon an enlarged protuberance 230d and the timer assembly 228 further comprises a single pole single throw switch 242 of the so-called "microswitch" type. The switch 242 is carries by a mounting flange 130d associated with the upper mounting plate 130, and is fastened thereto by means of screws 244 passing through the switch 242 and threaded into openings 246 in the flange 130d. The switch includes terminals 242a and 242b (FIG. 8) for connection to electrical conductors and, as will be described, is effective to turn off and on the clock movement 128.

The switch 242 is provided with a cam follower arm 242c pivotable about a pin 242d and having a cam follower roller 242e associated therewith. As can best be seen in FIGS. 8 and 12, the cam follower roller follows along the cam surface of the timer cam 230a. When the roller is moved by the cam protuberance 230d, the cam follower arm 242c depresses a switch button 242f on the switch 242 thus opening the switch 242. As will more clearly appear, opening of the switch 242 is effective to deenergize the cooking device 30.

The timer shaft 230, as shown best in FIG. 9, extends upwardly through an opening 248 in the casing 102 where it is keyed to a timer knob 250 by means of splines 230e. The knob 250 is held in place on the shaft 230 by means of a screw 252 carried in a recess 253, which is covered with a decorative cap 255. The knob 250 includes a substantially cylindrical portion 250a for manual operation of the knob and a flange portion 250b which may be provided with numerals indicating the length of the cooking cycle.

When the knob 250 is rotated and set for a cooking cycle of any desired length up to four hours, the cam follower roller 242e will be moved away from the protuberance 230d and the clock movement 128 will be actuated. The clock movement will be effective in rotating the timer pinion 224 and thus turning the timer gear 236 and the timer shaft 230 until the end of the timed cycle, at which time the cam follower roller 242e will again be cammed outwardly by the protuberance 230d thus opening the switch 242, and turning off the clock movement 128.

In accordance with a novel aspect of the present invention, the control unit 100 is provided with unique means for allocating electrical power to the upper and lower heating elements 62 and 34 of the cooking device 30. Thus, the control device 100 is provided with a proportioning control 254, (FIGS. 9 and 12) which includes a proportioning cam 256 comprising an inverted generally dish-shaped portion 256a and a downwardly extending cylindrical shaft portion 256b which is journaled in a bearing 258 carried in an opening 260 in the upper mounting plate 230. The lip 256c of the generally dish-shaped portion 256a is provided with peripheral gear teeth 262, 96 in number, which mesh with the proportioning control pinion 225. It can thus be seen that the proportioning cam 256 will be driven through a complete rotation once each four minutes that the proportioning control pinion 225 is rotated by the clock movement 128. The upper surface of the proportioning cam 256 comprises a camming surface 256d including thereon a multi-section recess 256e.

The proportioning control 254 additionally comprises a cam follower assembly 264 including a proportion selector arm 266 and a cam follower arm 268. A heel portion 266a of the arm 266 is pivotally fastened to the upper mounting plate 130 by means of a rivet or other fastener 270 which passes through an opening 272 in the upper mounting plate 130 and an opening 267 in the heel portion 266a. The proportion selector arm 266 includes a generally upwardly rising portion 266b and an outwardly extending angularly offset end portion 266c which includes an elongated generally arcuate opening 274 defined in part by a gear rack 266d.

Passing through the opening 274, there is a proportion selector shaft 276 which includes an inner shaft portion 276a having a recess 278 therein for slidably receiving an upper shank portion 256f of the proportioning cam 256. The proportion selector shaft 276 also includes an outer sleeve portion 276b. The selector shaft 276 passes through an opening 280 in a bearing support 282.

The bearing support 282 is mounted upon the upper mounting plate 130 by means of a pair of spaced feet 282a which flank the opening 222 and which are fastened by means of screws 286 to openings 284 in the upper mounting plate 130. The bearing support 282 is accommodated by a recess 288 in the upper casing portion 104. The selector shaft 276 is rotatably supported in the bearing support 282 by means of a pair of annular washers or rings 292 carried by the shaft 276, and which sandwich the support 282.

An opening 290 is provided in the upper casing portion 104 for the passage therethrough of the shaft 276. A proportion control knob 294 is keyed to the shaft 276 by means of splines 295, and is held thereon by means of a screw 296 received in a recess 298 in the knob 294. The recess 298 may be closed with a decorative cap 300. The knob 294 consists of a substantially cylindrical portion 294a for the manual rotation of the knob, and a flange portion 294b which may contain suitable markings, as will become obvious.

The outer sleeve portion 276b of the selector shaft 276 additionally includes gear teeth 276c for registry with the gear rack 266d. Thus, it may be understood that when the knob 294 is manually rotated, the gear teeth 276c will move the gear rack 266d and thus alter the position of the cam follower assembly 264 with respect to the proportioning cam 256.

Figure 13:
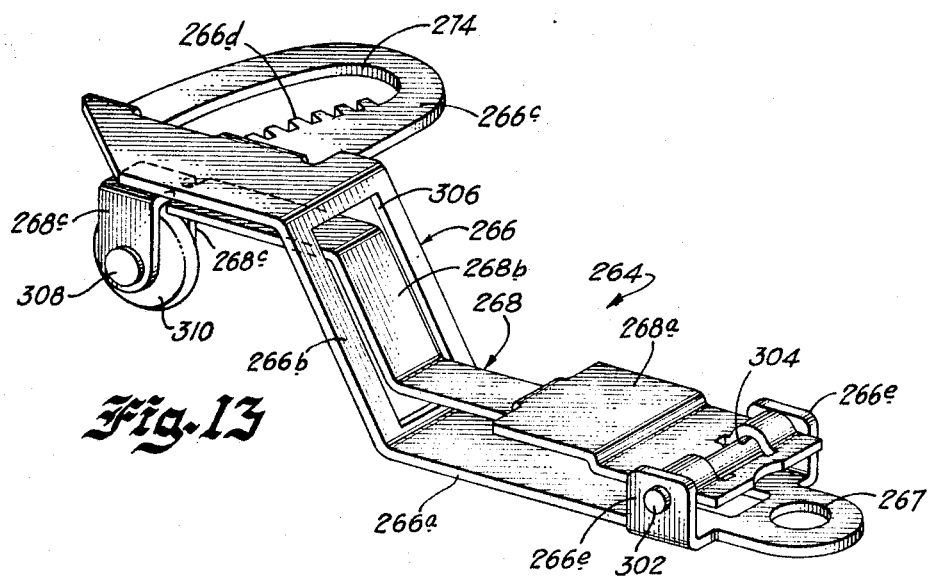
FIG. 13 is an enlarged perspective view of the cam follower arm of the control of FIG. 6.

The proportion selector arm 266 (FIG. 13) includes a pair of spaced flanges 266e carrying a pin 302 which is journaled in a passageway 304 formed by deforming part of a heel portion 268a of the follower arm 268. A shank portion 268b of the follower arm 268 extends upwardly within an opening 306 in the inclined portion 266b of the selector arm 266. The follower arm 268 also includes mounting fingers 268c carrying a pin 308 for mounting a freely rotatable cam follower wheel 310.

Above the cam follower assembly 264 there is positioned a proportioning control switch 312, shown in broken lines in FIG. 12, which is a single pole double throw switch of the "microswitch" type. Switch 312 is mounted upon a pair of raised mounting flanges 130e and 130f (FIG. 10) associated with the upper mounting plate 130. The switch 312 is mounted by means of mounting screws 316 threaded into openings 314 provided on the flanges 130e and 130f. Three terminals 312a are provided for wiring the switch 312, and a switch actuating button 312b is positioned to be depressed by the heel portion 268a of the follower arm 268 when the arm is lifted.

Having reference now to the cam surface 256d of the the proportioning cam 256, it can be seen that the multisection recess 256e therein has four identical symmetrical outwardly directed lobes, having a configuration in the nature of a four-pointed star or a four-leafed flower. As best seen in FIGS. 8 and 12, the central portion of the cam surface 256d lies entirely within the recess, with the four lobes gradually tapering as they extend outwardly, so that at its outer periphery, the cam surface lies entirely outside the recess. It should be understood that the percentage of the cam surface occupied by the recess gradually decreases from 100% at the center to 0% at the edge.

It can be seen that as the proportioning cam 256 rotates, the cam follower roller 310 will ride along the rotating cam surface 256d. As the roller 310 is cammed into and out of the recess 256e, the cam follower arm 268 will be effective in changing the position of the switch actuating button 312b from its depressed to its non-depressed position. As the position of the selector arm 266 is varied by means of rotation of the knob 294, the cam follower wheel 310 may be made to track along the cam surface 256d either entirely within the recess or entirely outside of the recess or in any intermediate position. The design of the recess is such that the proportion of the time during which the roller is in the recess is variable at will between 100% of the time and 0% of the time. This proportion may be fixed by rotation of the proportion control knob 294.

Having reference now to FIG. 14, and to the operation of the cooking device 30, when the control unit 100 is attached to the cooking device and the cover is closed, the control assembly will be in electrical communication with both the upper and lower heating elements 62 and 34. This connection as previously described is accomplished by means of the 3-prong connectors 164 and 150, but, for purposes of clarity, are schematically illustrated as conductors 325, 326, 327 and 328 in FIG. 14.

The clock movement 128 is effective to rotate the proportioning cam 256 and the timer cam 230a when the timer knob is turned to an "on" position. Thus, when the power cord 118 is connected to a suitable electrical outlet, it can be seen that the electrical clock movement 128 and the thermostat switch contact 190 will be connected to one side of the voltage source, the other side of which is connected to one of the contacts 242a of the timer switch 242. When the timer switch is closed, in the manner previously described, current will flow through the switch contact 242a and a conductor 329 to the clock movement 128, so that the clock movement will be energized and the timer cam 230a and the proportioning cam 256 will begin to rotate, as previously described.

The heating elements 62 and 34 are arranged in parallel with one another, each connected between the proportioning control switch 312 and the thermostatic switch 186. In accordance with the invention, the proportioning control actuates either one or the other of the heating elements. As the proportioning cam rotates, the follower roller 310 will always be either in the recess 256e or outside of the recess. When it is outside the recess, so that the contacts of the switch 312 are closed, as illustrated in FIG. 14, the lower heating element 34 will be energized over the conductors 330 and 331. The lower heating element 34 is also connected to thermostat switch contact 189 by means of conductor 327, so that when the thermostat switch 186 is closed, the lower heating element 34 will be energized.

When the roller 310 is in the recess 256e, the upper heating element 62 will become energized in a similar fashion, through conductors 330, 325, and 326, provided the thermostat switch 186 remains closed.

Thus it can be seen that the two heating elements may be alternatively energized throughout the cooking cycle. In the alternative, either one or the other of the heating elements may be used alone. For example, when the device is adjusted as illustrated in FIGS. 8 and 12, with the roller 310 circumscribing the outer edge of the cam surface 256d, the lower element will be energized alone, and the device may be used as a fry pan. On the other hand, when the cam follower roller 310 is moved to the center of the cam surface 256d, the upper element alone is energized, and the device may be used as a broiler. In the intermediate positions, various proportions of heat from above and below are effective to accomplish a baking function. In accordance with this feature the present invention, the single control unit 100 permits of selective control of both elements, and allows the cooking device 30 to be used as a frying pan, oven or broiler.

When the heat of the pan exceeds a predetermined value, as above described, switch 186 will open, and the heating elements 34 and 62 will be de-energized until the temperature falls again. During this period, however, the clock movement continues to run, so that the predetermined duration of the cooking cycle is not disturbed.

In a device constructed in accordance with the present invention, the time lag of the thermostat switch, or the length of time necessary for the switch to close again after being opened by the member 196, was approximately one minute. Since the heat proportion cam 256d rotates once each four minutes and is divided into four symmetrical parts, it should be understood that the one minute time lag will always end at the same point in the heat proportion cycle at which it began.

In order to indicate to the operator when the heating elements are deenergized by the thermostat switch 186, the control unit is provided with a pilot light L, which is part of a pilot light circuit including conductors 332, 333, 334 and a resistance R.

The pilot light L is supported in the control unit 100 by a pilot light support 317, which is held in place by means of a fastener 318 extending through a hole in the support 316 and a hole 320 in the upper mounting plate 130. Another hole 321 in the upper mounting plate 130 receives a positioning tongue 317a associated with the pilot light support 317. The pilot light is visible from outside the control unit 100 through a translucent insert 322 provided in an opening 323 in the upper casing portion 104 for that purpose.

The pilot light will be energized whenever the thermostat switch 188 is closed, so that the operator will know when the device has reached the desired temperature.

FIG. 14 illustrates the circuit in condition for energizing the lower heating element 34. In this condition, the timer switch 242 is connected to one side of the power source through one side of the power cord 118. When the timer switch is closed for operation of the cooking device, the clock movement 128 is connected to the other side of the power source by conductor 329. Furthermore, the lower heating element 34 is connected to the timer switch 242 by the proportion control switch 312 and conductors 331 and 328. Until cooking temperature is reached, thermostat switch 186 is closed and lower element 34 is connected to the other side of the power source via the power cord 118, switch 186 and conductor 327. In addition, closing of switch 186 energizes the pilot light L through a circuit including conductor 332, resistor R, conductor 333, pilot light L and conductor 327.

When by means of the proportion control, the switch 312 is reversed, the upper heating element 62 is energized by a circuit including the timer switch 242, proportion control switch 312 and conductor 325, as well as conductor 326, the thermostat switch 186 and the power cord 118. The clock movement 128 and the pilot light L are energized in the same manner regardless of which heating element is energized.

In accordance with an alternative embodiment of the present invention there is provided an alternative control unit 400, illustrated in the drawings in FIGS. 15 through 21. The control unit 400 is adapted to be used in place of the control unit 100 on the cooking device, and, as will be described, is connected to the cooking device 30 in a similar manner as was the control unit 100.

A casing 402 of the control unit 400 is comprised of an upper portion 404 and a lower portion 406, held together when assembled by means of suitable fasteners which may be inserted through openings 408 in the lower casing portion 406 and into the upper portion 404 in a manner known to those skilled in the art.

Proper alignment of the upper casing portion 404 and the lower casing portion 406 is aided by recesses 410 which are disposed along a portion of the upper edge of the lower casing portion 406, and which form shoulders 406a. The shoulders 406a cooperate with other shoulders (not illustrated) in the upper casing portion 404.

Entrance of a power cord 412 into the interior of the control unit 400 is provided for by means of an opening 414 provided in the casing 402. The opening 414 is comprised of cooperating recesses 414a and 414b in the casing portions 404 and 406. The opening 414 includes an enlarged recess 416 for the reception during assembly of a strain relief member 418 which is fixed to the power cord 412. Within the control unit 400 the power cord 412 may be suitably electrically connected to provide for the operation of the cooking device 30, as will be more fully understood as the description proceeds. In the drawings, with the exception of the schematic drawing shown in FIG. 21, the internal wiring of the control unit 400 is omitted for purposes of clarity. For purposes of decoration, the top surface of the upper casing portion 404 may be provided with a foil insert 420. The edges of the foil insert 420 are flanked by a slightly raised ridge 404a in order to hold the foil insert in place and to insure a smooth surface on the top of the casing 402.

In order to provide for the support of the internal structure of the control unit 400, there is provided a mounting plate 422. The mounting plate 422 is supported in the casing 402 by means of four dependent legs 422a each having an outwardly extending foot 422b. The feet 422b are held in recesses 424 provided on mounting shoulders 406b which are integral with the lower portion 406 of the casing. Gaps 426 in the feet 422b are provided for the passage therethrough of the fasteners which hold the casing together. The upper casing portion 404 includes cooperating mounting shoulders 404b which rest upon the mounting shoulders 406b and enclose the feet 422b.

In order to provide for connecting the upper heating unit 62 of the cooking device 30 to the control unit 400, there is provided an upper terminal connection assembly 428. The assembly 428 includes a layer of insulating material 430 which rests upon the upper mounting plate 422, and an upper terminal block 432 resting immediately above the insulating pad 430. Each end of the terminal block 432 is provided with a slot 433 whereby the block 432 is held in position by means of a pair of mounting tabs 422c which extend upwardly from the mounting plate 422.

The upper terminal block 432 is provided with a pair of spaced two-section recesses 434, each of which includes an upper section 434a (FIG. 17) for receiving a three-pronged connector 436. A lower section 434b of the recess 434 allows for the passage therethrough of a lug portion 436a of the connector 436. The lug portions 436a provide for ease in the connection of the connectors 436 to suitable wire conductors, as will be understood as the description proceeds.

Immediately above the upper terminal block 432 there is positioned a terminal cap member 438 which has a pair of spaced openings 440 through which the three-pronged connectors 436 extend. As can best be seen in FIG. 17, the openings 440 closely surround the prongs of the connectors 436, thus holding them in their proper positions.

In order to accommodate the upper terminal connection assembly 428 the upper casing portion 404 is provided with a raised terminal cover portion 404c, which defines a well 429. The raised portion 404c, as can best be seen in FIG. 17, encloses the three-pronged connectors 436, the terminal cap 438 and the upper terminal block 432. A pair of spaced openings 442 are provided in the raised portion 404c, and are aligned with the three-pronged connectors 436. The openings 442 are provided with resilient grommets 444, formed of rubber or plastic or the like, which have inwardly extending flexible tongues 444a for preventing grease and food from entering the control unit 400 when the upper heating element 62 is not connected to the terminal connection assembly 428.

To provide for interconnection of the control unit 400 and the lower heating element 34, there is provided a lower terminal connection assembly 446 in the lower casing portion 406 which is provided with a pair of spaced recesses 448 defined by mounting shoulders 406c and walls 406d. The walls 406d have mounting slots 450 provided therein. Each of the recesses 448 receives a three-pronged connector 452, having a rearwardly extending lug portion 452a for connection with suitable wire conductors. The three-pronged connectors 452 additionally include a pair of mounting flanges 452b which extend outwardly into the slots 450, thus holding the three-pronged connectors 452 in position in the recesses 448.

A pair of lower terminal blocks 454, which abut the mounting shoulders 406c in the lower casing 406, aid in holding the three-pronged connectors in the recesses 448. The terminal blocks 454 have a generally U-shaped cross section, with the legs of the U being defined by a pair of downwardly extending flanges 454a which overlie the walls 406d. The top of each of the terminal blocks 454 includes a protuberance 454b which is received in an opening 456 in the mounting plate 422. It can thus be seen that when the control unit 404 is assembled the terminal blocks 454 will be held firmly in place.

Access to the three-pronged connectors 452 is provided by means of a pair of spaced openings 458 provided in the casing 402. The openings 458 are positioned in alignment with the connectors 452 and are comprised of cooperating recesses 458a and 458b provided in the upper and lower casing portions 404 and 406.

It can now be understood that when the control unit 400 is connected to the cooking device 30, the control unit will abut the heating element support 42. As described above, in connection with the previously described embodiment, the two ends of the lower heating element 34 extend from the support 42 and include terminal portions adapted to extend through the spaced openings 458 and make connection with the three-pronged connectors 452. In addition it should be understood that when the cover 52 of the cooking device 30 is closed, the end terminal portions 62e of the upper heating element 62 will extend downwardly to the openings 442, forcing away the flexible tongues 442a, and make connection with the upper three-pronged connectors 436. In this manner the control unit 400 is adapted to be simultaneously connected with both the upper and the lower heating elements 62 and 34.

In order to control the temperature of the cooking device 30, the control unit 400 is provided with a temperature control assembly which includes a bimetal probe 462. The bimetal probe 462 extends outside of the case 402 through an opening 464 provided for that purpose. When the control unit 400 is connected to the cooking device 30, the bimetal probe 462 is received in the bore 43 in the element support 42, and is thereby placed in intimate heat sensing relationship with the cooking surface of the pan 32.

In order to provide for the support of the temperature control assembly and the bimetal probe 462, there is provided a support plate 466. The plate 466 has a pair of outwardly extending ears 466a, and is welded or otherwise suitably connected to the probe 462. The outwardly extending ears 466a are carried by a pair of mounting ears 422d associated with a supporting flange 422e on the mounting plate 422. The ears 466a are fastened to the plate 422 by means of rivets or other suitable fasteners 468.

The supporting flange 422e is provided with a recessed portion 470, lying between the ears 422d, which allows for the passage therethrough of the support plate 466. The support plate 466 is supported at its central portion on a supporting flange 422f associated with the mounting plate 422. An elongated fastener 472, which passes through an opening 474 of the flange 422f serves to hold the support plate 466 against the flange 422f.

The temperature control assembly includes a switch 476 comprising a pair of generally parallel resilient leaf spring members 477 and 478, which carry cooperating contact members 479 and 480. The spring members 477 and 478 are supported beneath the support plate 466 by the elongated fastener 472, which also carries insulating spacers 482, 483 and 484.

As will be readily understood by those skilled in the art, the bimetal probe 462 includes an actuating member 486 which is movable in response to changes in heat which are sensed by the probe. In the device illustrated, the actuating member 486, due to temperature differentials of the elements of the probe 462, will move in an upward direction, as viewed in FIG. 16, when the pan 32 is subjected to an increase in temperature.

The actuating member 486 carries an insulated member 486a which is adapted to strike an extension 477a of the leaf spring member 477 when the pan 32 reaches a critical temperature. When this occurs, the switch 476 is opened, and as will be more fully understood as the description proceeds, the supply of the electrical energy to the cooking device 30 is halted.

To provide for selective control of the temperature at which the switch 476 will be opened, there is provided a temperature control shaft 488 having a threaded portion 488a, which is received in an internally threaded opening 490 in the support plate 466. The temperature control shaft 488 includes a downwardly extending insulated portion 488b which passes through an enlarged opening 477b, and strikes the lower leaf spring member 478, thus adjusting its position.

The temperature control shaft 488 also includes an upwardly extending portion 488c, which passes through an opening 494 in the upper casing portion 404. The end of the extending portion 488c is received in a recess 496 in a temperature control knob 498. The temperature control knob 498 is held in place by a screw 500, a washer 501 and a coil spring 502. The recess 496 in the knob 498 may be closed by a decorative cap 504.

The temperature control knob 498 includes a generally cylindrical portion 498a for a manual rotation of the knob, and a flange portion 498b which may be provided with markings indicating the temperature setting of the control unit 400. It will be understood that as the knob 498 is turned, the shaft 488 will be threaded through the opening 490 and will thus adjust the position of the leaf spring member 478, thus regulating the temperature at which the switch 476 will be opened.

In order to limit the rotation of the temperature control knob 498, the upper casing portion 404 is provided with an annular recess 506 lying under the knob 498. Along the periphery of the annular recess 506 there is positioned a stop member 404d which cooperates with another stop (not shown) integral with the knob 498. In this manner the rotation of the knob 498 is limited to just under 360°. This prevents the temperature control assembly 460 from being adjusted to any position lying outside the normal range of the cooking device 30.

In order to indicate to the operator when power is being supplied to the heating device 30, there is provided a pilot light assembly 508, including a pilot light holder 510 and a pilot light L. The pilot light L may be suitably supported by a rearwardly extending portion 422g of the support plate 466, and by a downwardly extending flange 404e associated with the upper casing portion 404. In order to provide for external visibility of the pilot light L, the upper casing portion 404 may be provided with an opening 512, which may be receive a translucent or transparent insert 514.

In order to provide for alternation of current flow between the upper and lower heating elements 62 and 34, the control unit 400 includes a proportioning control assembly 516. The control 516 is positioned within a well 518 formed by a recessed portion 406e in the floor of the lower casing portion 406. For supporting the proportioning control 516 there is provided a proportioning control support bracket 520, which includes an upwardly extending portion 520a having a small mounting tab 520b associated therewith. The tab 520b is received in an opening 522 provided in the temperature control assembly support plate 466.

The support bracket 520 includes a generally horizontal shank portion 520c and a pair of downwardly extending legs 520d and 520e. Mounted against the underside of the shank 520c, and extending between the legs 520d and 520e, there is provided a switch 524. The switch 524 is mounted by means of a screw 526 which extends upwardly through an opening 528 in the switch 524, through an opening 530 in the bracket 520 and is threaded into an internally threaded opening 532 at the bottom of the elongated fastener 472. Thus it can be seen that by means of the screw 526 and the elongated fastener 472, the support bracket 520 and the switch 524 are firmly held in place within the control unit 400.

The switch 524 is a single pole double throw switch of the so-called "microswitch" variety, and includes a switch actuating button 524a on its underside. The switch is provided with three outwardly extending terminals 524b, 524c and 524d and the operation of the switch is such that when the switch button 524a is depressed (or pressed upwardly into the body of the switch 524), the terminals 524b and 524d are electrically interconnected, while terminals 524b and 524c are not connected. On the contrary, when the switch button 524a is not depressed the terminals 524b and 524c are connected, while terminals 524b and 524d are open. The normal position of the switch 524, shown in solid lines in FIG. 21 and in FIG. 16 is such that the switch button 524a is not depressed.

Beneath the switch 524 there is positioned a bimetal actuating member 534. As can be seen in FIGS. 19 and 20 the actuator 534 is generally Y-shaped, having a single extending leg or stem 534a at one end and a pair of legs 534b and 534c extending from the other end (FIG. 20).

The bimetal actuator 534 is held suspended in position by means of a bolt 536 which extends through the body of the switch 524 and which includes a head 536a which is illustrated as abutting against the underside of the leg 534c of the actuator 534. A section of paper insulation 538 is placed immediately above the actuator 534, and a spacer 540 is provided between the insulation material 538 and the underside of the switch 524. A nut is threaded onto the threaded end of the bolt 536, and abuts the top of the switch 524. It should be noted that the bolt 536 which passes through the body of the switch 524 does not make electrical connection with the internal structure of the switch.

In addition, means including a bolt 544 are provided to electrically interconnect the leg 534b of the actuator 534 and the terminal 524c of the switch 524 (FIGS. 16 and 20). An elongated spacer is positioned between the terminal 524d and the insulation material 538, and a nut 548 completes the assembly.

In accordance with the present invention the switch 524 performs the function of channelling electrical current to the upper and lower heating elements 62 and 34. Accordingly the switch terminal 524b is connected to one side of the electrical input of the control unit 400 by means of conductor 550. The switch terminal 524d is connected to the lower heating element 34 by means of a conductor 552. As above described the switch terminal 524c is connected to the leg 534b of the actuator 534. The other leg 534c of the actuator 534 is connected to the upper heating element 62 by means of a conductor 554 which may be connected to the bolt 536 as will be readily understood by those skilled in the art.

Thus it can be seen that when the switch 524 is in its normal position as illustrated in FIG. 16, and in solid lines in FIG. 21, the upper heating element will be energized by a current flow through the actuator 534. The high expansion side of the bimetal actuator 534 is on the bottom as viewed in the drawings, and the flow of current therethrough will cause the actuator to flex. In its flexed position, as shown in dotted lines in FIG. 21, the actuator will depress the switch button 524a. When this occurs the electric current will be caused to flow through the lower heating element 34, thus allowing the actuator 534 to cool and become unflexed.

When cooled, the actuator 534 will return to its original position, again energizing the upper heating element 62. This cycle will be continuously repeated until such time as the power is disconnected from the power unit 400.

More specifically, having reference to FIG. 21, the actuator 534 is illustrated in its cool position and thus switch 524 is in its normal position. Current flows between the upper heating element 62 and the power source through the power cord 412, conductor 550, switch terminal 524b, switch terminal 524c, actuator leg 534b, actuator leg 534c and the conductor 554. Passage of current through legs 534b and 534 causes the actuator to be heated and to flex to the position shown in broken lines in FIG. 21, as will be explained in more detail hereinafter, thus depressing the switch button 524a. This disconnects the upper heating element 62 from the power source, and connects the lower heating element to the power source through a circuit including the power cord 412, conductor 550, switch terminal 524b, switch terminal 524d, and conductor 552. This circuit does not include the actuator 534, which cools while the lower element 34 is energized until it allows the switch 524 to return to its normal position, thus again energizing the upper element 62. As will be explained in more detail hereinafter, both the upper and lower heating elements 62 and 34 are connected to the other side of the power line through the thermostat switch 476.

According to a novel feature of the present invention, the proportion of time that the alternative elements are energized may be continuously varied. Accordingly there is provided a proportion control shaft 556 which includes a non-conductive extension 556a which bears against the leg 534a of the actuator 534, and the position of the end of the extension 556a will determine the portion of "on" time allocated to the heating elements by adjusting the position of leg 534a of the actuator 534. Forcing the leg 534a downwardly will impede flexion of the actuator 534, thus increasing the time during which current flows to the upper element 62. Conversely, raising the leg 534a will lengthen the portion of time that the lower heating element is actuated.

In order to provide for raising and lowering the leg 534a, the shaft 556 includes a threaded portion 556b received in an internally threaded opening 558 in the support plate 466. An upwardly extending portion 556c of the shaft 556 extends through an opening 560 in the mounting plate 422, through an opening 562 in the upper casing portion 404, and into a recess 564 provided in a proportioning knob 566. The knob 566 is held in place by means of a screw 568, a washer 570 and a coil spring 572. The recess 564 may be covered with a decorative cap 574.

The knob 566 is provided with a cylindrical portion 566a for manually turning the knob, and a flange portion 566b which may be provided with markings indicating the proportion of current allocated to the heating units. In order to limit the rotation of the knob 566, the upper casing portion 404 is provided with an annular recess 576 lying beneath the flange 566b of the knob 566. The edge of the recess 576 is provided with a stop 404e which cooperates with another stop (not shown) on the underside of the knob 566. Thus the rotation of the shaft 566 is limited to just less than 360°. It has been found that this amount of rotation is sufficient to vary the leg 534a between an upper position in which the lower heating element operates all the time and lower position in which the upper heating element operates all the time. Thus, in the upper position the actuator depresses the switch button 524a even when cool so that the lower heating element 34 is continuously energized. In the lower position of shaft 566, the actuator 534 is held away from button 524a so that button 534a is not depressed even when the actuator is fully flexed, and the upper heating element 62 is energized continuously. In addition, the knob may be turned to any intermediate position desired, so that the heating elements may be controlled to operate for any desired proportion of time.

Factory adjustment of the proportion control 516 is provided for by means of an adjustment screw 578 which is threaded through an opening 580 in a foot portion 520f of the support bracket 520. The screw is provided with a lock nut 581 and is adapted to bear against the actuator 534.

Having reference now to FIG. 21, the operation of the control unit 400 when used with the cooking device 30 will be apparent from the foregoing description. When the power cord 412 is connected to a suitable 115 volt power source, one side of the line is connected to one terminal 478 of the thermostat switch 476 by means of a conductor 582, while the other side of the line is connected to the terminal 524b of the switch 524. At any given time, as discussed above, current will either flow through the upper or lower heating element. The current returns to the thermostat switch 476 from the upper heating element 62 through a conductor 584, and from the lower heating element 34 through a conductor 586.

Thus it can be seen that the actuator 534 is effective in alternatively cycling the current to the heating elements in a continuing sequence throughout the cooking operation, providing the temperature control switch 476 remains closed. The operation of the temperature control assembly is such that when a predetermined temperature is reached, the thermostat switch 476 will be opened, and no current will flow into the heating elements 34 and 62. When this occurs, the pilot light L, which is in a pilot light circuit including a resistance R and conductors 590a, 590b and 590c, will be deenergized. Thus, the operator will be aware when the desired cooking temperature is reached.

It should be noted that in the normal position of the actuator 534, the upper heating element 62 is energized. Thus, when the cooking device is started, the upper element 62 will always go on first (unless the proportioning control is set for operation of the lower unit alone). In addition, whenever the temperature control assembly temporarily interrupts the operation of the device, the actuator 534 will have ample opportunity to cool and return to its normal position before the thermostat actuator 486 again allows the thermostat switch 476 to close. This operation is highly desirable, since if the lower element 34 were to go on first, there might be heating conditions under which the upper element might never go on even though the heat proportioning knob 566 were set to hav the upper element on part of the time.

In a device built in accordance with the present invention, the unique construction and mounting of the actuator 534 allows the cooking device 30 to maintain the desired ratio of time of energization of the two heating elements over any normal range of ambient temperatures within the control unit 400. These ambient temperatures were found to range from room temperature at the beginning of a cooking cycle to about 200° F. or more. It has been found that the generally Y-shape of the actuator 534 has the desirable characteristic of not flexing when subjected to a uniform increase in temperature over its entire surface, as would be the effect of an increase of ambient temperature on a conventional bimetal strip.

An additional characteristic of the actuator 534 is that when one part of its area is subjected to a higher temperature than the rest, flexion will occur. Thus, when electric current flows between the legs of the Y-shaped actuator, the temperature increases at the narrowest point, or thet junction of the legs. Since the actuator contacts the switch button 524a near this point, it can be seen that the actuator is highly effective in operating the switch consistently regardless of the ambient temperature.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A cooking device comprising a pan, a first heating element supported in heating relationship with said pan, a cover for said pan, a second heating element spaced from said pan and supported by said cover, a control assembly removably connected to the device for controlling the operation of said heating elements, and a pair of electrical terminals on each of said heating elements for electrical connection of the heating elements, said control assembly including electrical connectors for simultaneous electrical connection with the electrical terminals of said first and second heating elements.

2. A cooking device comprising a pan having a first heating element supported in heating relationship with said pan, a cover supporting a second heating element spaced from said pan, said first and second heating elements each including electrical terminals for the electrical connection of said heating elements, and a control assembly removably connected to the device for controlling said heating elements, said control assembly including electrical connectors for simultaneous electrical connection of the control assembly with the electrical terminals of said first and second heating elements, and said control assembly additionally including a probe for sensing the heat within the cooking device.

3. A cooking device comprising a pan, a cover hinged at one side thereof to said pan for closing and opening, an electrical resistance heating element supported in said cover, electrical terminals on said heating element adjacent the opposite side of said cover for the electrical connection of said heating element, removable control means carried by said pan including electrical connectors adapted to receive said terminals only when the cover is closed to make connection with said heating element, whereby said terminals are disconnected from said connectors when said cover is opened, thereby disconnecting said heating element.

4. A cooking device comprising a pan, a first heating element supported in heating relationship with said pan, a cover hinged to said pan for opening and closing, a second heating element spaced from said pan and supported by said cover, electrical terminals on said first and second heating elements for the electrical connection of said heating elements, a removable control unit for controlling said heating elements, first electrical socket means in said control unit for electrical connection of the control unit with the electrical terminals of said first heating element, second electrical socket means in said control unit for receiving the electrical terminals of said second heating unit upon the closing of said cover, and means including a temperature sensitive probe on said control unit for supporting said control unit against said pan.

5. An electric cooking device, comprising a portable cooking chamber, said chamber comprising a vessel and a cover for said vessel, an electric heater on the bottom of said vessel, an electric heater on the inside of said cover, and a control unit connected to said chamber for regulating the cooking temperature in said chamber by energizing each heater alone to the total exclusion of the other and by energizing said heaters alternately, and means in said control unit for adjusting the alternate energization of said heaters by varying the on time of each heater with respect to the on time of the other heater.

6. In an electric cooking device as in claim 5, wherein said vessel comprises an electric frypan, a temperature sensing zone formed on said frypan, said control unit having a temperature sensor in separable thermal contact with said zone, each heater having a pair of electric terminals, and said control unit having a pair of electric contacts for separable electric contact with each pair of electric terminals, whereby said control unit is removably connected to said cooking device.

7. In an electric cooking device as in claim 6, wherein said cover is removably hinged to said frypan, said control unit being removably mounted on said frypan, and the pair of electric terminals of the cover heater being engageable and disengageable with its corresponding pair of electric contacts on the control unit by closing and opening movement respectively of the cover.

8. In an electric cooking device as in claim 7, wherein said heaters are alternately energized by a motor, a cam, and a cam follower in said control unit, said cam being driven by said motor and said cam follower being in engagement with said cam, and the means for varying the alternate on time of said heaters comprising means for adjusting the position of said cam and cam follower with respect to each other.

9. In an electric cooking device as in claim 8, a timing mechanism in said control unit, said timing mechanism being driven by said motor, a switch operated by said timing mechanism for terminating operation of said motor and heaters, and means for adjusting said timing mechanism to vary the total cooking time of said cooking device.

10. In an electric cooking device as in claim 7, wherein said heaters are alternately energized by a thermally responsive device in said control unit, said thermally responsive device comprising a generally Y-shaped and flat bimetallic element, the outer ends of the two arms of said Y-shaped member being fixed and having electrical terminals connected thereto for electrically heating said element, the outer end of the stem of said Y-shaped element being free, and an abutment for said outer free end whereby the central portion of said element will snap in opposite directions upon alternate electric heating and cooling of said element, and the means for varying the alternate on times of said heaters comprises means for adjusting the position of said abutment.

11. The cooking device of claim 3 further comprising shielding means supported by said cover on said opposite side thereof and engaging said control means to cover said terminals and said connectors when the cover is closed.

12. A cooking device comprising a pan, a first heating element supported in heating relationship with said pan, a cover for said pan, a second heating element spaced from said pan and supported by said cover, a removable control assembly for controlling the operation of said heating elements, a pair of electrical terminals on each of said heating elements, said control assembly including electrical connectors for simultaneous electrical connection with the electrical terminals of said first and second heating elements, and control means in said control assembly for operating said first and second heating elements in alternating sequence.

References Cited
UNITED STATES PATENTS

| | | | |
|---|---|---|---|
| 3,245,337 | 4/1966 | White et al. | 219—524 |
| 2,786,928 | 3/1957 | Roll et al. | 219—525 |
| 3,154,004 | 10/1964 | Huck | 99—337 |
| 3,190,989 | 6/1965 | Komatsu | 99—333 |
| 3,243,576 | 3/1966 | Lee et al. | 219—386 |

RICHARD M. WOOD, *Primary Examiner.*

C. L. ALBRITTON, *Assistant Examiner.*